No. 618,492. Patented Jan. 31, 1899.
G. BELL.
COMBINED CURTAIN POLE HANGER AND SHADE ROLLER HOLDER.
(Application filed Nov. 13, 1897.)
(No Model.)
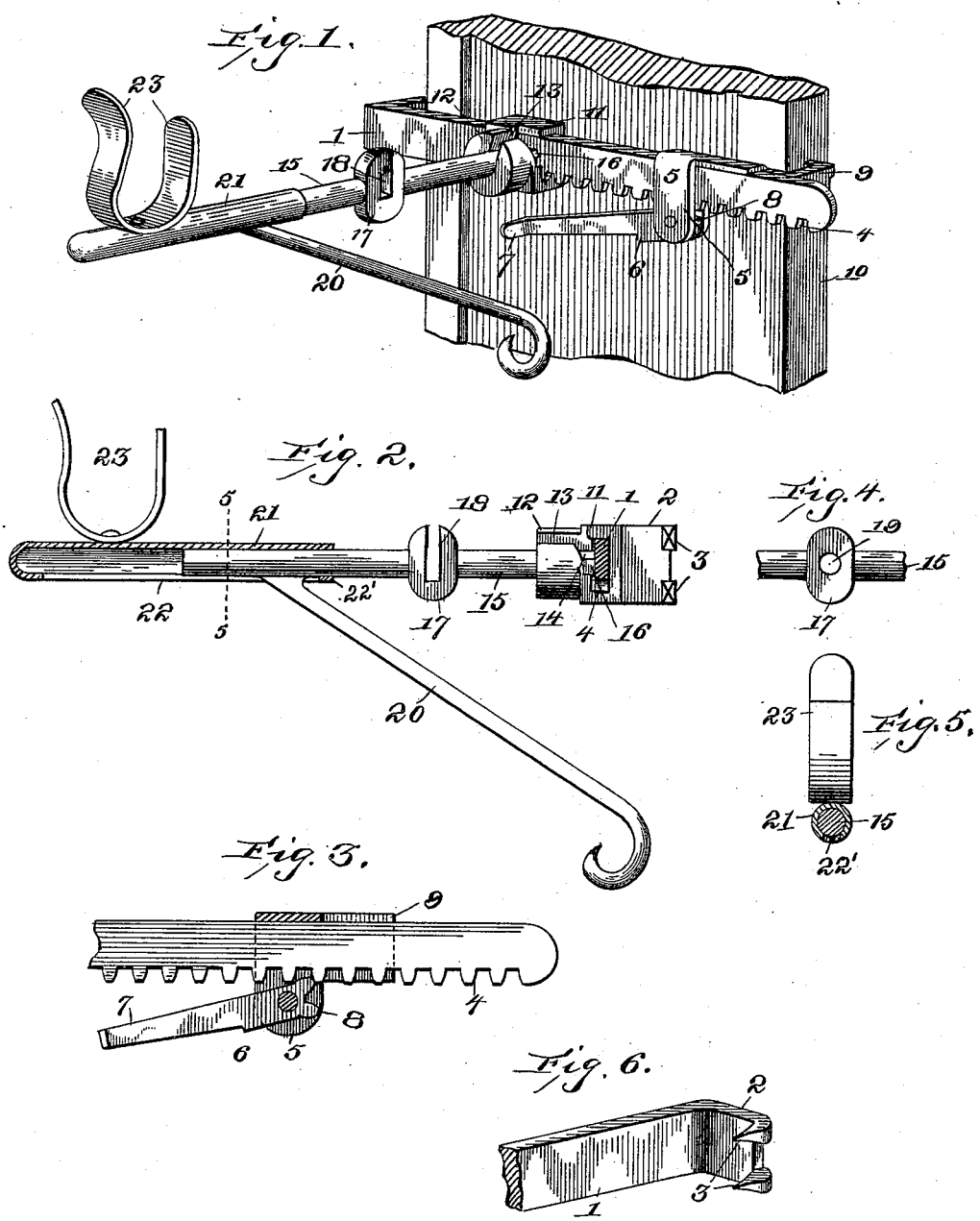
Witnesses
Wm H. Edwards Jr
L. E. Warner
Inventor
George Bell
By Glascock & co
Asso. Attorneys

UNITED STATES PATENT OFFICE.

GEORGE BELL, OF MUNCIE, INDIANA.

COMBINED CURTAIN-POLE HANGER AND SHADE-ROLLER HOLDER.

SPECIFICATION forming part of Letters Patent No. 618,492, dated January 31, 1899.

Application filed November 13, 1897. Serial No. 658,406. (No model.)

*To all whom it may concern:*

Be it known that I, GEORGE BELL, a citizen of the United States, residing at Muncie, in the county of Delaware and State of Indiana, have invented certain new and useful Improvements in a Combined Curtain-Pole Hanger and Shade-Roller Holder; and I do hereby declare the following to be a full, clear, and exact description of the same, reference being had to the accompanying drawings, forming a part thereof.

My invention has relation to curtain-pole hangers and shade-roller holders combined; and it consists in the novel construction and arrangement of its parts, as hereinafter described.

The object of my invention is to provide a device as above indicated, said device being provided with a clamping mechanism whereby it can be easily and readily attached to the molding of the window-frame, the combined curtain-pole hanger and shade-roller being adjustably attached to the clamping mechanism. The curtain-pole hanger and the shade-roller hanger can be readily detached from the clamping mechanism and shifting device, and the curtain-pole hanger may be adjusted in or out independently of the hanger for the shade-roller.

In the accompanying drawings, Figure 1 is a perspective view of the device attached to the molding of the window-frame. Fig. 2 is a side elevation, partly in section, of the device as shown in Fig. 1. Fig. 3 is an elevation of a means for operating the clamping mechanism. Fig. 4 is an elevation of the perforated arm adapted to receive the cylindrical end of the shade-roller. Fig. 5 is a transverse sectional view cut on the line 5 5 of Fig. 2, illustrating the frictional contact between the sleeve and the rod located in the sleeve. Fig. 6 is a perspective view of one of the claws of the clamping mechanism.

The clamping mechanism consists of the member 1, said member having at its end an angular extension 2, provided with the claws 3 3, the said claws extending substantially parallel to the body portion of the member 1. The lower edge of the member 1 is provided with a number of gear-teeth 4 4. A sleeve 5 passes down perpendicularly along the front and rear faces of the member 1, as shown in Fig. 1, the said sleeve having pivoted in its lower portion the lever 6, said lever being provided at its free end with the finger-piece 7 and at its opposite end with the locking-teeth 8, said teeth 8 being adapted to mesh with the teeth 4 of the member 1. The sleeve 5 is connected to the member 9, said member 9 having an extension and claws similar to the extension 2 and the claws 3 of the member 1. The claws of the member 9 extend toward the claws 3 of the member 1. The members 1 and 2 are adapted to receive the front face of the molding 10, the extensions of the said members passing along the edges of the molding, and when the lever 6 is turned toward the clawed end of the member 1 the teeth 8, meshing with the teeth 4, cause the members 1 and 9 to slip longitudinally with relation to each other, and thus the claws of the said members are brought toward each other and are caused to enter the edges of the molding 10, and thus the clamping mechanism is secured in place. When the clamping mechanism is thus secured in place, the teeth 8 of the lever 6 will be wedged against the teeth 4 of the member 1, as shown in Fig. 3, and thus the members 1 and 9 will be prevented from moving away from each other. Should it be advisable, a wire may be employed to bring the lower end of the lever 7 up in the vicinity of the lower edge of the member 1, the wire passing around the lever 7 and the member 1, and thus, as the lever 7 cannot move, the members 1 and 9 will be held in proper relation to each other. The sleeve 11 is mounted on the member 1. Said sleeve is adapted to slip longitudinally on the said member. The sleeve 11 is provided on its front face with a boss 12, said boss having the longitudinal slot 13, the inner end of said slot 13 terminating in the spiral slot 14. The horizontal rod 15 is provided at its inner end with the lug 16, the inner end of the rod 15, together with the lug 16, being adapted to enter the interior of the boss 12, the lug 16 first passing along the slot 13, and then as the rod 15 is turned the lug 16 enters the spiral slot 14, and thus impinges the inner end of the rod 15 against the front face of the member 1, thus making the collar 11 substantially stationary with the member 1 at the point of contact. At one side of the window the rod 15 is provided with a section 17, having an elongated opening 18, and at the opposite side of the window the rod 15 is provided with a similar section 17, having a rounded perforation 19. The perforations 18 and 19 are constructed so as to receive the opposite ends of the shade-rollers as now generally in use. One end of the shade-rollers as now in use is provided with a semicircular extension, while the opposite end is provided with a flattened extension, the semicircular extension being adapted to enter the perforation 19, while the flattened extension enters the elongated perforation 18. The member 20 is fixed at its outer end to the under side of the rod 15, as shown in Figs. 1 and 2, the inner end of said members being adapted to come in contact with the front face of the molding 10, as shown in Fig. 1. Thus the fixture is firmly braced perpendicularly. A sleeve 21 fits snugly over the outer end of the rod 15. The portions 22' of the sleeve 21 are bent up, and thus the brace 20 may be slipped past the said portions when the sleeve 21 is mounted on the rod 15. After the brace 21 has cleared the portions 22' the said portions are then bent down in the positions as shown in Fig. 5. The frictional contact between the inner surface of the sleeve 21 and the outer surface of the rod 15 is sufficient to retain the said sleeve 21 at any desired point on the rod 15. The lower portion of the sleeve 21 is provided with an elonged opening 22, said opening being adapted to receive the upper end of the member 20. The U-shaped strip 23 is attached to the upper side of the sleeve 21, the said strip 23 being adapted to receive the end of the curtain-pole.

The operation of the device is as follows: It is obvious that the clamping mechanism, consisting of the members 1 and 2, can be readily adjusted to fit any width of molding. The clamping mechanism is located in position upon the molding. The sleeves 11 are then shifted to their proper positions upon the members 1. The inner ends of the rods 15 are inserted in the openings and slots of the bosses 12, and thus the sleeves 11 are impinged in their proper positions upon the members 1. The shade-roller is then inserted in the perforations 18 and 19. The curtain-pole is then lodged in the U-shaped strips 23, and the sleeves 21 are extended in or out to suit the fancy of those employing the device. It will thus be seen that the curtain-pole may be shifted in or out independent of the remainder of the device, and that the rods 15 and the collars 11 may be shifted laterally independent of the clamping mechanism and that the clamping mechanism may be adjusted to adapt itself to any width of molding.

In order to adjust the clamping mechanism so as to make it fit a particular width of molding, the lower end of the lever 7 is swung as far as possible to the right, and thus said lever will be in a substantially horizontal position and the teeth 8 will clear the gear-teeth 4 4 of the member 1, and thus the member 1 may be shifted longitudinally through the sleeve 5, and when the proper relative positions of the members 1 and 9 are had the lever is swung to the left, and thus the claws are made to grip the edges of the molding.

Having thus described my invention, what I claim as new, and desire to secure by Letters Patent, is—

A combined curtain-pole and shade-roller support, consisting of two members, each member having at its ends oppositely-disposed claws, the members being adapted to move longitudinally with relation to each other, one member having in its edge a number of gear-teeth, the other member having a sleeve adapted to receive the first said member, a lever fulcrumed in said sleeve, said lever having at its upper end teeth adapted to engage the gear-teeth of the first said member, a movable sleeve mounted on the first said member, a curtain-pole hanger and shade-roller support connected to the last said sleeve.

In testimony whereof I affix my signature in presence of two witnesses.

GEORGE BELL.

Witnesses:
W. A. RICHISON, Sr.,
S. A. RICHISON.